(12) United States Patent
Wu et al.

(10) Patent No.: US 10,738,162 B2
(45) Date of Patent: Aug. 11, 2020

(54) HIGH-TEMPERATURE RESISTANT MODIFIED SILICON-CONTAINING CYANATE ESTER RESIN AS WELL AS PREPARATION METHOD AND APPLICATION THEREOF

(71) Applicant: Suzhou Taihu Electric Advanced Material Co, Ltd., Suzhou (CN)

(72) Inventors: Bin Wu, Suzhou (CN); Chunqi Zhang, Suzhou (CN); Jianfeng Gu, Suzhou (CN); Fengxi Jing, Suzhou (CN); Feng Qiu, Suzhou (CN); Zhifeng Xia, Suzhou (CN); Junfeng Ma, Suzhou (CN)

(*) Notice: Subject to any disclaimer, the term of this patent is extended or adjusted under 35 U.S.C. 154(b) by 98 days.

(21) Appl. No.: 15/972,174

(22) Filed: May 6, 2018

(65) Prior Publication Data

US 2018/0251604 A1  Sep. 6, 2018

Related U.S. Application Data

(63) Continuation of application No. PCT/CN2016/096229, filed on Aug. 22, 2016.

(30) Foreign Application Priority Data

Nov. 6, 2015 (CN) .......................... 2015 1 0746188

(51) Int. Cl.
| | |
|---|---|
| C08G 77/14 | (2006.01) |
| C08G 73/06 | (2006.01) |
| C08L 83/06 | (2006.01) |
| C08G 81/02 | (2006.01) |
| C08G 59/32 | (2006.01) |
| C08G 77/452 | (2006.01) |
| C08K 3/04 | (2006.01) |

(52) U.S. Cl.
CPC ..... C08G 73/0644 (2013.01); C08G 59/3281 (2013.01); C08G 73/065 (2013.01); C08G 77/14 (2013.01); C08G 77/452 (2013.01); C08G 81/024 (2013.01); C08G 81/025 (2013.01); C08L 83/06 (2013.01); C08K 3/04 (2013.01)

(58) Field of Classification Search
CPC .. C08G 77/14; C08G 77/452; C08G 73/0644; C08G 77/26
See application file for complete search history.

(56) References Cited

U.S. PATENT DOCUMENTS

| | | | |
|---|---|---|---|
| 8,058,380 B1 | 11/2011 | Vij et al. | |
| 8,987,388 B2* | 3/2015 | Swier ................. | C08L 83/06 |
| | | | 106/287.1 |
| 10,030,141 B2* | 7/2018 | Chiba ................. | C08K 3/36 |
| 2010/0280151 A1 | 11/2010 | Nguyen et al. | |
| 2014/0288245 A1* | 9/2014 | Swier ................. | C08L 83/06 |
| | | | 525/474 |
| 2018/0334567 A1* | 11/2018 | Kawamura ........ | C08G 59/1433 |

FOREIGN PATENT DOCUMENTS

| | | | |
|---|---|---|---|
| CN | 101418074 A | | 4/2009 |
| CN | 101565545 A | | 10/2009 |
| CN | 102079874 A | | 6/2011 |
| CN | 103304999 | * | 9/2013 |
| CN | 104086587 A | | 10/2014 |
| CN | 104448820 | * | 3/2015 |
| CN | 104448820 A | | 3/2015 |
| CN | 105199103 A | | 12/2015 |
| CN | 105367793 | * | 3/2016 |
| WO | 2015143434 A1 | | 9/2015 |

OTHER PUBLICATIONS

International Search Report of PCT/CN2016/096229, dated Nov. 18, 2016.

* cited by examiner

*Primary Examiner* — Margaret G Moore
(74) *Attorney, Agent, or Firm* — Erson IP (Nelson IP)

(57) ABSTRACT

The present invention relates to a high-temperature resistant modified silicon-containing cyanate ester resin as well as a preparation method and an application thereof. The preparation method comprises the following steps: adding a mixed solution of hydroxyl silicone oil, a silane coupling agent and an organic solvent into a mixed solution of a tetramethylammonium hydroxide aqueous solution and a polar solvent, performing hydrolytic polycondensation at a temperature of 5-40° C. for 4-8 h, and performing distillation to obtain an epoxy-containing silsesquioxane; performing pre-polymerization on the epoxy-containing silsesquioxane and a cyanate ester resin at a temperature of 50-100° C. for 1-8 h to obtain a modified cyanate ester resin; and uniformly mixing the modified cyanate ester resin and a modified anhydride, thereby obtaining the high-temperature resistant modified silicon-containing cyanate ester resin.

10 Claims, No Drawings

HIGH-TEMPERATURE RESISTANT MODIFIED SILICON-CONTAINING CYANATE ESTER RESIN AS WELL AS PREPARATION METHOD AND APPLICATION THEREOF

CROSS-REFERENCE TO RELATED APPLICATIONS

This application is a continuation of International Patent Application No. PCT/CN2016/096229 with a filing date of Aug. 22, 2016, designating the United States, and further claims priority to Chinese Patent Application No. 201510746188.9 with a filing date of Nov. 6, 2015. The content of the aforementioned applications, including any intervening amendments thereto, are incorporated herein by reference.

TECHNICAL FIELD

The present invention belongs to the technical field of polymer materials, and particularly relates to a high-temperature resistant modified silicon-containing cyanate ester resin as well as a preparation method and an application thereof.

BACKGROUND OF THE PRESENT INVENTION

A uniform solidified core layer formed by compounding carbon fibers and resins is arranged inside a carbon fiber compound core conductor, while the material has extremely high requirements for a curing speed, glass-transition temperature, toughness and the like of the resins.

At present, common resins belong to an epoxy resin system, while a general epoxy resin system has a defect of low heat resistance. Although partial resins have good heat resistance, the glass-transition temperature Tg of a cured matter is generally not higher than 180° C., interfacial properties are poor, and tensile strength and toughness are poor. Although high heat resistance may be obtained by modifying the general epoxy resin, the general epoxy resin is difficult to be applicable to large-scale production due to limited raw materials and a complicated manufacturing process.

Since the adopted epoxy resin system has great problems in heat-resisting class and raw materials, a new-generation resin with more excellent high-temperature-resistant characteristics and intrinsic toughness than the epoxy resin is needed at present. Then, a cyanate ester resin seizes the opportunity to respond to market demands and inevitably becomes a new development direction.

Although the cyanate ester resin has extremely high heat resistance, toughness of the cyanate ester resin is insufficient due to a limitation of the own structure, and the cyanate ester resin is difficult to be directly applied to a pultrusion process. Then, modification of the cyanate ester resin becomes a necessary trend. In a traditional modification method, an additional toughening agent or resin is adopted for compounding, but such a method may bring influences that the glass-transition temperature is decreased and partial mechanical properties and electrical properties are reduced.

SUMMARY OF PRESENT INVENTION

A technical problem to be solved in the present invention is to provide a high-temperature resistant modified silicon-containing cyanate ester resin capable of meeting resin viscosity and achieving toughness enhancement and heat resistance of resins as well as a preparation method and an application thereof in a carbon fiber compound core conductor.

In order to solve the above technical problem, the present invention adopts the following technical solution:

A preparation method of a high-temperature resistant modified silicon-containing cyanate ester resin comprises the following steps:

step (1), adding a mixed solution of hydroxyl silicone oil, a silane coupling agent and an organic solvent into a mixed solution of a tetramethylammonium hydroxide aqueous solution and a polar solvent, performing hydrolytic polycondensation at a temperature of 5-40° C. for 4-8 h, and then performing distillation to obtain an epoxy-containing silsesquioxane;

step (2), performing pre-polymerization on the epoxy-containing silsesquioxane obtained in the step (1) and a cyanate ester resin at a temperature of 50-100° C. for 1-8 h to obtain a modified cyanate ester resin; and step (3), uniformly mixing the modified cyanate ester resin obtained in the step (2) and a modified anhydride, thereby obtaining the high-temperature resistant modified silicon-containing cyanate ester resin.

Preferably, in the step (1), a temperature of the hydrolytic polycondensation is 5-15° C.

Preferably, in the step (2), a temperature of the pre-polymerization is 80-90° C.

Preferably, a mass fraction of the tetramethylammonium hydroxide aqueous solution is 5-20%.

Preferably, the polar solvent is selected from n-butyl alcohol or isopropanol.

Preferably, the silane coupling agent is selected from γ-(2,3-epoxypropoxy) propyl trimethoxysilane or β-(3,4-epoxycyclohexyl) ethyl trimethoxysilane.

Preferably, the organic solvent is selected from methanol, ethanol, benzene, methylbenzene, xylene or cyclohexane.

Preferably, the cyanate ester resin is selected from one or a compound of more of bisphenol A cyanate ester resin monomers or prepolymers thereof, bisphenol E cyanate ester resins, phenolic cyanate ester resins, bisphenol F cyanate ester resins, bisphenol M cyanate ester resins and dicyclopentadiene cyanate ester resins; and the modified anhydride is selected from one or a compound of more of modified methyl tetrahydrophthalic anhydride, modified methylhexahydrophthalic anhydride, modified methyl nadic anhydride, tetrahydrophthalic anhydride, hexahydrophthalic anhydride, 5-norbornene-2,3-dicarboxylic anhydride, methyl-5-norbornene-2,3-dicarboxylic anhydride, methyl endo-methylene hexahydrophthalic anhydride, glutaric anhydride, terpene acid anhydride, methylcyclohexene tetracarboxylic dianhydride, dodecenyl succinic anhydride, tetrabromophthalic anhydride, tetrachlorophthalic anhydride, methyl tetrabromophthalic anhydride, methyl tetrachlorophthalic anhydride, hexachloro-endo-methylene tetrahydrophthalic anhydride, diglycerol (dehydrated trimellitate) acetic ester, benzenetetracarboxylic anhydride and benzophenonetetracarboxylic dianhydride.

Certainly, the cyanate ester resin and the modified anhydride may also be other available raw materials, not limited to the above.

More preferably, the cyanate ester resin is selected from one or a compound of two in the bisphenol A cyanate ester resin and the bisphenol F cyanate ester resin.

More preferably, the modified anhydride is selected from one or a compound of more of the modified methyl tetrahydrophthalic anhydride, the modified methylhexahydrophthalic anhydride and the modified methyl nadic anhydride.

Preferably, a feeding mass ratio of the tetramethylammonium hydroxide aqueous solution to the polar solvent to the hydroxyl silicone oil to the silane coupling agent to the organic solvent is (0.5-10):(15-200):1:(4-60):(3-6).

Further preferably, a feeding mass ratio of the tetramethylammonium hydroxide aqueous solution to the polar solvent to the hydroxyl silicone oil to the silane coupling agent to the organic solvent is (0.5-2):(15-30):1:(4-10):(3-6).

Preferably, a dropping speed of the mixed solution of the hydroxyl silicone oil, the silane coupling agent and the organic solvent is controlled to be 18-75 g/h.

Further preferably, the dropping speed of the mixed solution of the hydroxyl silicone oil, the silane coupling agent and the organic solvent is controlled to be 55-70 g/h.

Preferably, a feeding mass ratio of the epoxy-containing silsesquioxane to the cyanate ester resin to the modified anhydride is 1:(8-10):(13-15).

Due to an implementation of the above technical solution, compared with the prior art, the present invention has the advantages as follows:

One major characteristic of the present invention is that, general epoxy resins with low heat resistance and glycidyl amine series epoxy resins with high heat resistance and high price are not used, but the existing new-generation cyanate ester resin with low price and high heat resistance is used. Brittleness of the cyanate ester resin is innovatively improved in an intrinsic toughening manner by adopting the epoxy-containing silsesquioxane without sacrificing the heat resistance of the cyanate ester resin, the glass transition temperature Tg better than that of the epoxy resin system is obtained, and a high-temperature resistant resin composition which has the Tg of 240-270° C. and is used for pultrusion molding can be prepared. The resin composition has extremely excellent high temperature resistance and good cost advantages.

Another characteristic of the present invention is to preferentially meet a requirement of the pultrusion molding for low viscosity of the resin; and by virtue of formula optimization of modified resins, the modified resins with different viscosities are selected and directly compounded, different from the traditional resin system that an additional diluent is needed, thereby avoiding hidden trouble that other properties are reduced.

DETAILED DESCRIPTION OF PREFERRED EMBODIMENTS

The present invention is further described below in detail in combination with specific embodiments. However, the present invention is not limited to the following embodiments.

Embodiment 1 steps: (a) adding 400 g of n-butyl alcohol and 20 g of tetramethylammonium hydroxide aqueous solution (with a mass fraction of 10%) into 1000 mL of three-mouth flask with a thermometer and a condensing tube, stirring and mixing uniformly, dropping 20 g of hydroxyl-terminated polydimethylsiloxane and a mixed solution of 120 g of γ-(2,3-epoxypropoxy) propyl trimethoxysilane and 80 g of ethanol into the above solution, controlling a dropping speed to complete dropping within 3 h, controlling a reaction temperature to 10° C., performing hydrolytic polycondensation for 6 h, and distilling off residual solvent and small molecules in the system by a rotary evaporator after the reaction is ended, thereby obtaining transparent viscous liquid capable of flowing at a room temperature for later use, i.e., the epoxy-containing silsesquioxane (G-POSS);

(b) pouring 30 g of the viscous liquid (G-POSS) and 270 g of bisphenol A cyanate ester resin into 500 mL of three-mouth flask and stirring uniformly, carrying out a pre-polymerization reaction at a temperature of 80-90° C. for 2 h, cooling the modified resin to the room temperature for later use, and measuring viscosity of the modified resin to be 5300 cps; and (c) pouring 420 g of modified methyl tetrahydrophthalic anhydride into 2000 ml of beaker, weighing 300 g of the above modified resin and adding into the beaker, uniformly stirring for 5-10 min, and testing various properties.

Test results of main properties of a modified resin cured matter are shown in Table 1.

Embodiment 2 steps: (a) adding 400 g of n-butyl alcohol and 20 g of tetramethylammonium hydroxide aqueous solution (with a mass fraction of 10%) into 1000 mL of three-mouth flask with a thermometer and a condensing tube, stirring and mixing uniformly, dropping 20 g of hydroxyl-terminated polydimethylsiloxane and a mixed solution of 120 g of γ-(2,3-epoxypropoxy) propyl trimethoxysilane and 80 g of ethanol into the above solution, controlling a dropping speed to complete dropping within 3 h, controlling a reaction temperature to 10° C., performing hydrolytic polycondensation for 6 h, and distilling off residual solvent and small molecules in the system by a rotary evaporator after the reaction is ended, thereby obtaining transparent viscous liquid capable of flowing at a room temperature for later use, i.e., a final product of epoxy-containing silsesquioxane (G-POSS);

(b) pouring 30 g of the viscous liquid (G-POSS) and 270 g of bisphenol F cyanate ester resin into 500 mL of three-mouth flask and stirring uniformly, carrying out a pre-polymerization reaction at a temperature of 80-90° C. for 2 h, cooling the modified resin to the room temperature for later use, and measuring viscosity of the modified resin to be 3050 cps; and (c) pouring 420 g of modified methyl tetrahydrophthalic anhydride into 2000 ml of beaker, weighing 300 g of the above modified resin and adding into the beaker, uniformly stirring for 5-10 min, and testing various properties.

Test results of main properties of a modified resin cured matter are shown in Table 1.

Embodiment 3 steps: (a) adding 400 g of n-butyl alcohol and 16 g of tetramethylammonium hydroxide aqueous solution (with a mass fraction of 10%) into 1000 mL of three-mouth flask with a thermometer and a condensing tube, stirring and mixing uniformly, dropping 26 g of hydroxyl-terminated polydimethylsiloxane and a mixed solution of 127 g of γ-(2,3-epoxypropoxy) propyl trimethoxysilane and 90 g of ethanol into the above solution, controlling a dropping speed to complete dropping within 3.5 h, controlling a reaction temperature to 10° C., performing hydrolytic polycondensation for 5 h, and distilling off residual solvent and small molecules in the system by a rotary evaporator after the reaction is ended, thereby obtaining transparent viscous liquid capable of flowing at a room temperature for later use, i.e., a final product of epoxy-containing silsesquioxane (G-POSS);

(b) pouring 30 g of the viscous liquid (G-POSS) and 270 g of bisphenol F cyanate ester resin into 500 mL of three-mouth flask and stirring uniformly, carrying out a pre-polymerization reaction at a temperature of 80-90° C. for 2 h, cooling the modified resin to the room temperature for later use, and measuring viscosity of the modified resin to be 5100 cps; and (c) pouring 420 g of modified methyl nadic anhydride into 2000 ml of beaker, weighing 300 g of the above modified resin and adding into the beaker, uniformly stirring for 5-10 min, and testing various properties.

Test results of main properties of a modified resin cured matter are shown in Table 1.

TABLE 1

| Performance indexes | | Embodiment 1 | Embodiment 2 | Embodiment 3 | Embodiment 4 |
|---|---|---|---|---|---|
| Appearance color | | Yellowish-brown | Yellowish-brown | Yellowish-brown | Yellowish-brown |
| Viscosity (mPa . s/25° C.) | | 580 | 425 | 630 | 670 |
| Working life (h/25° C.) | | 8-10 | 8-10 | 8-10 | 8-10 |
| Gelation time (min/200° C.) | | 14 | 13 | 15 | 15 |
| Glass transition temperature Tg(° C.) | | 245 | 258 | 265 | 262 |
| Tensil test | Tensile strength MPa | 90 | 95 | 98 | 97 |
| | Tensile deformation % | 2.4 | 2.3 | 2.1 | 2.1 |
| | Tensile modulus MPa | 2400 | 2500 | 2550 | 2500 |
| Bending test | Bending strength MPa | 75 | 80 | 82 | 85 |
| | Bending deformation % | 3.7 | 3.1 | 3.2 | 3.1 |
| | Bending modulus MPa | 2400 | 2460 | 2510 | 2520 |
| Compression test | Compression strength MPa | 210 | 220 | 230 | 235 |
| | Compressive deformation % | 23 | 21 | 20 | 20 |
| | Compression modulus MPa | 2200 | 2340 | 2460 | 2510 |

Embodiment 4 steps: (a) adding 400 g of n-butyl alcohol and 25 g of tetramethylammonium hydroxide aqueous solution (with a mass fraction of 10%) into 1000 mL of three-mouth flask with a thermometer and a condensing tube, stirring and mixing uniformly, dropping 15 g of hydroxyl-terminated polydimethylsiloxane and a mixed solution of 130 g of γ-(2,3-epoxypropoxy) propyl trimethoxysilane and 80 g of ethanol into the above solution, controlling a dropping speed to complete dropping within 4 h, controlling a reaction temperature to 10° C., performing hydrolytic polycondensation for 7 h, and distilling off residual solvent and small molecules in the system by a rotary evaporator after the reaction is ended, thereby obtaining transparent viscous liquid capable of flowing at a room temperature for later use, i.e., a final product of epoxy-containing silsesquloxane (G-POSS);

(b) pouring 45 g of the viscous liquid (G-POSS) and 255 g of bisphenol F cyanate ester resin into 500 mL of three-mouth flask and stirring uniformly, carrying out a pre-polymerization reaction at a temperature of 80-90° C. for 3 h, cooling the modified resin to the room temperature for later use, and measuring viscosity of the modified resin to be 4200 cps; and (c) pouring 420 g of modified methyl nadic anhydride into 2000 ml of beaker, weighing 300 g of the above modified resin and adding into the beaker, uniformly stirring for 5-10 min, and testing various properties.

Test results of main properties of a modified resin cured matter are shown in Table 1.

Reference Embodiment 1 steps: (a) adding 400 g of n-butyl alcohol and 20 g of tetramethylammonium hydroxide aqueous solution (with a mass fraction of 10%) into 1000 mL of three-mouth flask with a thermometer and a condensing tube, stirring and mixing uniformly, dropping 20 g of hydroxyl-terminated polydimethylsiloxane and a mixed solution of 120 g of γ-(2,3-epoxypropoxy) propyl trimethoxysilane and 80 g of ethanol into the above solution, controlling a dropping speed to complete dropping within 3 h, controlling a reaction temperature to 10° C., performing hydrolytic polycondensation for 1 h, and distilling off residual solvent and small molecules in the system by a rotary evaporator after the reaction is ended, thereby obtaining transparent viscous liquid capable of flowing at a room temperature for later use, i.e., the epoxy-containing silsesquioxane (G-POSS);

(b) pouring 30 g of the viscous liquid (G-POSS) and 270 g of bisphenol A cyanate ester resin into 500 mL of three-mouth flask and stirring uniformly, carrying out a pre-polymerization reaction at a temperature of 80-90° C. for 2 h, cooling the modified resin to the room temperature for later use, and measuring viscosity of the modified resin to be 4300 cps; and (c) pouring 420 g of modified methyl tetrahydrophthalic anhydride into 2000 ml of beaker, weighing 300 g of the above modified resin and adding into the beaker, uniformly stirring for 5-10 min, and testing various properties.

Test results of main properties of a modified resin cured matter are shown in Table 2.

Reference Embodiment 2 steps: (a) adding 400 g of n-butyl alcohol and 20 g of tetramethylammonium hydroxide aqueous solution (with a mass fraction of 10%) into 1000 mL of three-mouth flask with a thermometer and a condensing tube, stirring and mixing uniformly, dropping 20 g of hydroxyl-terminated polydimethylsiloxane and a mixed solution of 120 g of γ-(2,3-epoxypropoxy) propyl trimethoxysilane and 80 g of ethanol into the above solution, controlling a dropping speed to complete dropping within 3 h, controlling a reaction temperature to 0° C., performing hydrolytic polycondensation for 6 h, and distilling off residual solvent and small molecules in the system by a rotary evaporator after the reaction is ended, thereby obtaining transparent viscous liquid capable of flowing at a room temperature for later use, i.e., epoxy-containing silsesquioxane (G-POSS);

(b) pouring 30 g of the viscous liquid (G-POSS) and 270 g of bisphenol A cyanate ester resin into 500 mL of three-mouth flask and stirring uniformly, carrying out a pre-polymerization reaction at a temperature of 80-90° C. for 2 h, cooling the modified resin to the room temperature for later use, and measuring viscosity of the modified resin to be 4100 cps; and (c) pouring 420 g of modified methyl tetrahydrophthalic anhydride into 2000 ml of beaker, weighing 300 g of the above modified resin and adding into the beaker, uniformly stirring for 5-10 min, and testing various properties.

Test results of main properties of a modified resin cured matter are shown in Table 2.

Reference Embodiment 3 steps: (a) adding 400 g of n-butyl alcohol and 20 g of tetramethylammonium hydroxide aqueous solution (with a mass fraction of 10%) into 1000 mL of three-mouth flask with a thermometer and a condensing tube, stirring and mixing uniformly, dropping 20 g of hydroxyl-terminated polydimethylsiloxane and a mixed solution of 120 g of γ-(2,3-epoxypropoxy) propyl trimethoxysilane and 80 g of ethanol into the above solution, controlling a dropping speed to complete dropping within 3 h, controlling a reaction temperature to 10° C., performing hydrolytic polycondensation for 6 h, and distilling off residual solvent and small molecules in the system by a rotary evaporator after the reaction is ended, thereby obtaining transparent viscous liquid capable of flowing at a room temperature for later use, i.e., epoxy-containing silsesquioxane (G-POSS);

(b) pouring 30 g of the viscous liquid (G-POSS) and 270 g of bisphenol A cyanate ester resin into 500 mL of three-mouth flask and stirring uniformly, carrying out a pre-polymerization reaction at a temperature of 60° C. for 1 h, cooling the modified resin to the room temperature for later use, and measuring viscosity of the modified resin to be 5100 cps; and (c) pouring 420 g of modified methyl nadic anhydride into 2000 ml of beaker, weighing 300 g of the above modified resin and adding into the beaker, uniformly stirring for 5-10 min, and testing various properties.

Test results of main properties of a modified resin cured matter are shown in Table 2.

TABLE 2

| Performance indexes | | Reference embodiment 1 | Reference embodiment 2 | Reference embodiment 3 |
|---|---|---|---|---|
| Appearance color | | Yellowish-brown | Yellowish-brown | Yeowish-brown |
| Viscosity(mPa . s/25° C.) | | 430 | 420 | 500 |

TABLE 2-continued

| Performance indexes | | Reference embodiment 1 | Reference embodiment 2 | Reference embodiment 3 |
|---|---|---|---|---|
| Working life(h/25° C.) | | 8-10 | 8-10 | 8-10 |
| Gelation time (min/200° C.) | | 15 | 16 | 14 |
| Glass transition temperature Tg(° C.) | | 225 | 210 | 230 |
| Tensile test | Tensile strength MPa | 80 | 75 | 87 |
| | Tensile deformation % | 1.94 | 1.7 | 2.1 |
| | Tensile modulus MPa | 2050 | 1900 | 2250 |
| Bending test | Bending strength MPa | 60 | 45 | 70 |
| | Bending deformation % | 2.9 | 2.5 | 3.4 |
| | Bending modulus MPa | 1900 | 1750 | 2260 |
| Compression test | Compression strength MPa | 175 | 150 | 190 |
| | Compressive deformation % | 18 | 16 | 21 |
| | Compression modulus MPa | 1850 | 1500 | 2170 |

The present invention is described above in detail, intended to enable those skilled in the art to know and implement contents of the present invention, not intended to limit a protection scope of the present invention. All equivalent changes or modifications made according to spiritual essence of the present invention should be included in the protection scope of the present invention.

We claim:

1. A preparation method of a high-temperature resistant modified silicon-containing cyanate ester resin, comprising the following steps:

step (1), adding a first mixed solution into a second mixed solution, performing hydrolytic polycondensation at a temperature of 5-40° C. for 4-8 h, and then performing distillation to obtain an epoxy-containing silsesquioxane; wherein the first mixed solution comprises hydroxyl silicone oil, a silane coupling agent and an organic solvent; the second mixed solution comprises a tetramethylammonium hydroxide aqueous solution and a polar solvent;

step (2), performing pre-polymerization on the epoxy-containing silsesquioxane obtained in the step (1) and a cyanate ester resin at a temperature of 50-100° C. for 1-8 h to obtain a modified cyanate ester resin; and step (3), uniformly mixing the modified cyanate ester resin obtained in the step (2) and an anhydride, thereby obtaining the high-temperature resistant modified silicon-containing cyanate ester resin.

2. The preparation method of the high-temperature resistant modified silicon-containing cyanate ester resin according to claim 1, wherein a mass fraction of the tetramethylammonium hydroxide aqueous solution in the second mixed solution is 5-20%.

3. The preparation method of the high-temperature resistant modified silicon-containing cyanate ester resin according to claim 1, wherein the polar solvent is selected from n-butyl alcohol or isopropanol; and the organic solvent is selected from methanol, ethanol, benzene, methylbenzene, xylene or cyclohexane.

4. The preparation method of the high-temperature resistant modified silicon-containing cyanate ester resin according to claim 1, wherein the silane coupling agent is selected from γ-(2,3-epoxypropoxy) propyl trimethoxysilane or β-(3,4-epoxycyclohexyl) ethyl trimethoxysilane.

5. The preparation method of the high-temperature resistant modified silicon-containing cyanate ester resin according to claim 1, wherein the cyanate ester resin is selected from one or more of bisphenol A cyanate ester resin monomers or prepolymers thereof, bisphenol E cyanate ester resins, phenolic cyanate ester resins, bisphenol F cyanate ester resins, bisphenol M cyanate ester resins and dicyclopentadiene cyanate ester resins; and the anhydride is selected from one or more of methyl tetrahydrophthalic anhydride, methylhexahydrophthalic anhydride, methyl nadic anhydride, tetrahydrophthalic anhydride, hexahydrophthalic anhydride, 5-norbornene-2,3-dicarboxylic anhydride, methyl-5-norbornene-2,3-dicarboxylic anhydride, methyl endo-methylene hexahydrophthalic anhydride, glutaric anhydride, terpene acid anhydride, methylcyclohexene tetracarboxylic dianhydride, dodecenyl succinic anhydride, tetrabromophthalic anhydride, tetrachlorophthalic anhydride, methyl tetrabromophthalic anhydride, methyl tetrachlorophthalic anhydride, hexachloro-endo-methylene tetrahydrophthalic anhydride, diglycerol (dehydrated trimellitate) acetic ester, benzenetetracarboxylic anhydride and benzophenonetetracarboxylic dianhydride.

6. The preparation method of the high-temperature resistant modified silicon-containing cyanate ester resin according to claim 1, wherein a feed ratio by weight of the tetramethylammonium hydroxide aqueous solution to the polar solvent to the hydroxyl silicone oil to the silane coupling agent to the organic solvent is (0.5-10):(15-200):1:(4-60):(3-6).

7. The preparation method of the high-temperature resistant modified silicon-containing cyanate ester resin according to claim 1, wherein an adding speed of adding the first mixed solution into the second mixed solution is controlled to be 18-75 g/h.

8. The preparation method of the high-temperature resistant modified silicon-containing cyanate ester resin according to claim 1, wherein a feed ratio by weight of the epoxy-containing silsesquioxane to the cyanate ester resin to the anhydride is 1:(8-10):(13-15).

9. A high-temperature resistant modified silicon-containing cyanate ester resin prepared by the preparation method of claim 1.

10. A method, the method comprising:
utilizing the high-temperature resistant modified silicon-containing cyanate ester resin of claim 9 in a carbon fiber compound core conductor.

* * * * *